US012193601B2

(12) United States Patent
Luo et al.

(10) Patent No.: US 12,193,601 B2
(45) Date of Patent: Jan. 14, 2025

(54) APPARATUS

(71) Applicant: KONINKLIJKE PHILIPS N.V., Eindhoven (NL)

(72) Inventors: ZhongChi Luo, Shanghai (CN); Weimin Xiao, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 931 days.

(21) Appl. No.: 17/044,936

(22) PCT Filed: Apr. 8, 2019

(86) PCT No.: PCT/EP2019/058775
§ 371 (c)(1),
(2) Date: Oct. 2, 2020

(87) PCT Pub. No.: WO2019/201638
PCT Pub. Date: Oct. 24, 2019

(65) Prior Publication Data
US 2021/0161330 A1 Jun. 3, 2021

(30) Foreign Application Priority Data
Oct. 2, 2018 (EP) ..................................... 18198074

(51) Int. Cl.
*A47J 27/00* (2006.01)
*A47J 36/32* (2006.01)
(Continued)

(52) U.S. Cl.
CPC ............. *A47J 36/32* (2013.01); *A47J 27/004* (2013.01); *A47J 37/0676* (2013.01);
(Continued)

(58) Field of Classification Search
CPC .... A47J 27/00; A47J 27/004; A47J 27/21141; A47J 27/21; A47J 37/067; A47J 37/0676;
(Continued)

(56) References Cited

U.S. PATENT DOCUMENTS

| 4,280,577 A | 7/1981 | Kunz | |
| 6,279,463 B1 * | 8/2001 | Kajiwara | ................ A47J 27/17 366/279 |

(Continued)

FOREIGN PATENT DOCUMENTS

| CN | 101101232 A | 1/2008 |
| CN | 202033096 U | 11/2011 |

(Continued)

OTHER PUBLICATIONS

International Search Report and Written Opinion Dated Jun. 12, 2019 for International Application No. PCT/EP2019/058775 Filed Apr. 8, 2019.

*Primary Examiner* — Reginald Alexander
(74) *Attorney, Agent, or Firm* — Maschoff Brennan (57) ABSTRACT

There is provided an apparatus (200, 300, 400, 500) comprising: a container (210, 310, 410, 510) configured to receive a food stuff, a base unit (220, 320, 420, 520) comprising a mounting member and a plurality of outer supporting members (324, 424, 524), a weight sensing unit (230, 330, 430, 530) configured to measure a weight of the food stuff contained in the container, and a connection assembly (240, 340, 440, 540) arranged between the container and the base unit. The weight sensing unit comprises a plurality of strain gauge load sensors arranged at the mounting member of the base unit, and the connection assembly is configured to provide a flexible and insulating connection between the container and the base unit so as to counteract thermal strain interference at the weight sensing (Continued)

unit and to reduce heat transfer between the container and the weight sensing unit.

16 Claims, 6 Drawing Sheets

(51) Int. Cl.
    *A47J 37/00*     (2006.01)
    *A47J 37/06*     (2006.01)
    *A47J 37/10*     (2006.01)
    *A47J 37/12*     (2006.01)
    *G01G 3/14*     (2006.01)
    *G01G 21/23*     (2006.01)
    *G01G 23/18*     (2006.01)

(52) U.S. Cl.
    CPC ......... *A47J 37/105* (2013.01); *A47J 37/1209* (2013.01); *G01G 3/14* (2013.01); *G01G 21/23* (2013.01); *G01G 23/18* (2013.01); *A47J 37/067* (2013.01)

(58) Field of Classification Search
    CPC ...... A47J 37/10; A47J 37/105; A47J 37/1209; A47J 37/1257
    See application file for complete search history.

(56) References Cited

U.S. PATENT DOCUMENTS

| | | | | |
|---|---|---|---|---|
| 2013/0334349 | A1* | 12/2013 | Carden | ............... A47J 43/0716 |
| | | | | 241/101.2 |
| 2017/0097256 | A1 | 4/2017 | Scheu | |
| 2018/0088084 | A1 | 3/2018 | Cahan | |
| 2018/0325318 | A1* | 11/2018 | De' Longhi | ........ A47J 37/1261 |
| 2020/0000264 | A1* | 1/2020 | Lingenheil | .............. F24C 7/087 |

FOREIGN PATENT DOCUMENTS

| | | | | | |
|---|---|---|---|---|---|
| CN | | 103402409 A | 11/2013 | | |
| CN | | 106102479 A | 11/2016 | | |
| CN | | 205923703 | 2/2017 | | |
| CN | | 107014469 A | 8/2017 | | |
| CN | | 206560260 | 10/2017 | | |
| DE | | 10344337 | 5/2005 | | |
| DE | | 102009045521 | 5/2011 | | |
| EP | | 1876433 | 1/2008 | | |
| GB | | 2525011 A | * | 10/2015 | ............ A47J 27/004 |
| JP | | 2017136474 | 8/2017 | | |
| WO | | 2012/030826 | 3/2012 | | |
| WO | | 2017/085676 | 5/2017 | | |

* cited by examiner

APPARATUS

CROSS REFERENCE TO RELATED APPLICATIONS

This application is the U.S. National Phase application under 35 U.S.C. § 371 of International Application No. PCT/EP2019/058775 filed Apr. 8, 2019, which claims the benefit of European Patent Application Number 18198074.9 filed Oct. 2, 2018 and Patent Application Number PCT/CN2018/083611 filed Apr. 18, 2018. These applications are hereby incorporated by reference herein.

FIELD OF THE INVENTION

The present disclosure relates to an apparatus capable of determining a weight applied thereto which is mechanically configured to reduce undesired effects to weight sensing measurements caused by a temperature change.

BACKGROUND OF THE INVENTION

There are many household appliances which require weight or force measurements. For example, sometimes it may be important to weigh an amount of food ingredients contained inside a cooking or food processing appliance for the purpose of monitoring a status of the food items.

Document 1 (WO2012030826A) relates to a food processing and preparation apparatus includes a housing having a footing portion and an arm section that together delimit a housing cavity, a vessel defining a food chamber and positionable in the housing cavity, and a blade mounted for movement within the food chamber of the vessel. But this Document 1 does not disclose how to improve the weighing accuracy.

Document 2 (WO2017085676A1) relates to an apparatus for cooking food comprising a casing, a lid and at least a support unit, wherein the support unit is configured to temporally support the container with respect to a support plane. The apparatus for cooking food also comprises a weighing unit associated with a control unit. But this Document 2 does not disclose the effect of heat distribution on the weighing accuracy and the solution for providing more accurate weighing in consideration of thermal effect on the load gauge.

Document 3 (EP1876433 A2) relates to a weighing module but does not disclose the container configured to receive a food stuff as well as the connection assembly between the container and the base unit.

Document 4 (US2017097256 A1) relates to a gravimetric measuring instrument including a housing and a weighing cell, but fails to disclose the container configured to receive a food stuff as well as the connection assembly between the container and the base unit.

Document 5 (US2018088084) relates to measure and/or monitor food doneness by using ultrasound. The present invention provides a method, system, computer program product and sensor for measuring and/or monitoring the degree of food doneness.

As an example, there is an increasing consumer demand for smart cooking appliances that are capable of automatically cook a food item accurately. Users typically using conventional cooking appliances (e.g. a fryer) have to regularly check the state of the food item inside the fryer, and they must determine by sight or by taking out at least a part of the food item as sample and tasting it during the cooking process. Many of the cooking appliances currently available have a timer function which allows users to set and keep track of a cooking time at the appliance. The cooking time may be set according to experience or a specific recipe, and it may also be based on the amount of food ingredients and temperatures used during the cooking process. However, even with the timer function sometimes it may be difficult to visually determine whether a status of the good ingredient. Hence, some of the currently available cooking appliances include a weighing functionality to monitor a change in weight of the food ingredients in order to determine their statuses.

It has been demonstrated that a static measurement of the initial weight of food ingredients can be used to guide subsequent steps in the cooking process, and also that non-invasive, accurate determination of a degree of doneness of the food ingredients can be achieved by dynamically monitoring the weight of the food ingredients when the food ingredients are being cooked in non-evaporative medium (e.g. air or oil). This is because the evaporative water loss of a food ingredient during cooking relative to the initial weight of the food ingredient is highly correlated to the thermal profile and the resulting texture of the food ingredient, which in turn are closely associated with a degree of doneness of the food ingredient.

In most cases, the amount of measured strain (i.e. linear deformation or change in length of any particular linear dimension of a solid body) is indicative of the amount of force applied. Therefore, one of the cost-efficient ways of adding a weighing functionality to a household appliance is to supply each foot of the appliance with a strain gauge load sensor and evaluate the changes in electrical resistance in a Wheatstone bridge circuit. In many currently known appliances a type of strain gauge load sensor is employed, which generally comprises: a strain inducing element for generating strain in response to an applied load, a wiring sheet, and strain gauges fixedly bonded to the strain inducing element and having soldered lead lines to form a bridge circuit for detection of the strain. The resistive characteristics of a strain gauge tend to change with temperature. Therefore, it is important to take into account the pattern of distribution of temperature at the strain gauge load sensor when determining a force applied to it, particularly when the load sensor is employed in household appliances where significant temperature changes can occur.

As an example, an object to be weighed may have a non-uniform temperature distribution, and the temperature distribution of the object may be transmitted to the strain gauge load sensor by conduction. This may cause the temperature at one of the strain gauges in the appliance to be different from that of another strain gauge, thereby creating a temperature gradient between the strain gauges in the load sensor. When the temperature-dependent coefficient of resistance of the strain gauges is not zero, a change in resistance corresponding to the temperature gradient develops between the strain gauges and would cause unwanted noise in the output signal. This type of temperature gradient usually occurs in cooking appliances. Moreover, a difference between the temperature of the object (e.g. a food item when it is heated) and the structure of the cooking appliance may cause a temperature gradient to be formed. As such, undesired heat would be transferred to the rest of the cooking appliance and thereby causing unwanted thermal strain at its structure. This thermal strain can also directly or indirectly cause undesired effects to the measurements at the strain gauge load sensor. For example, for an air fryer where the doneness of the food ingredients is monitored by its weight, erroneous measurements may occur if heat from the food ingredients being cooked is transferred to the structure of the air fryer and especially to parts adjacent to the strain gauge load sensor. The same problem may occur for other types of cooking appliances such as a rice cooker with a steamer.

SUMMARY OF THE INVENTION

Since a high accuracy can be achieved at a relatively low cost compared to other types of sensing technologies (e.g. due to the provision of high precision analog-to-digital converters), it is increasingly more popular to integrate weight sensing functionalities into cooking appliances for the purpose of determining a status of food items. However, most of these integrated weight sensors are only capable of measuring an initial weight of the food items. These weight sensors are unable to perform continuous measurement of weight change accurately during cooking largely due to the thermally driven shift caused by various sources of heat transfer, as explained above.

In currently known devices with weighing functionality there are high requirements for thermal and strain isolation for the load sensor. Accordingly, it would be advantageous to provide an apparatus capable of performing continuous weight sensing accurately during heating or cooking, the apparatus comprising an arrangement that can help minimize weight measurement errors and interferences caused by a difference in temperature at the apparatus by providing low-cost insulation.

As noted above, there are a number of disadvantages associated with the currently available configurations for providing weight sensing functionalities at cooking appliances. To better address one or more of the concerns mentioned earlier, in a first aspect, there is provided an apparatus comprising a container configured to receive a food stuff; a base unit comprising a mounting member and a plurality of outer supporting members; a weight sensing unit configured to measure a weight of the food stuff contained in the container, the weight sensing unit comprising a plurality of strain gauge load sensors arranged at the mounting member of the base unit; and a connection assembly arranged between the container and the base unit, wherein the connection assembly is configured to provide a flexible and insulating connection between the container and the base unit so as to counteract thermal strain interference at the weight sensing unit and to reduce heat transfer between the container and the weight sensing unit.

In some embodiments, each of the plurality of strain gauge load sensors may be arranged horizontally between a respective outer supporting member of the base unit and the mounting member of the base unit.

In some embodiments, the connection assembly may be configured to flexibly connect the container and the base unit such that a line of gravity of a combined weight of the container and the food stuff received at the container aligns with the center point of a shape formed by the plurality of strain gauge load sensors.

In some embodiments the connection assembly may comprise: a housing unit fixedly attached to a base of the container, and a plurality of inner supporting members fixedly attached to an inner top surface of the housing unit. The housing unit may be configured to accommodate the mounting member of the base unit, and the plurality of inner supporting members may be in movable contact with the base unit such that the container and the housing unit are movable as a single part with respect to the base unit. In these embodiments, the connection assembly may further comprise: a plurality of pivoting units fixedly attached to the mounting member of the base unit. Each of the plurality of pivoting units may comprise a concave surface so as to allow movable coupling with a respective inner supporting member such that the combined weight of the container and the food stuff received at the container is evenly distributed at the weight sensing unit.

Moreover, in these embodiments, the housing unit may comprise a shoulder portion configured to releasably engage with at least two opposite sides of the mounting member of the base unit such that the base unit is movably integrated with the housing unit and the container. The shoulder portion may comprise a shielding member configured to shield the weight sensing unit from convective heat transfer from external surroundings. At least one of an inner surface of the housing unit and a top surface of the mounting member may comprise a reflective coating layer.

In some embodiments, the connection assembly may comprise a bellows member enclosing a space between the container and the base unit. The bellows member may comprise concertinaed sides so as to allow a combined weight of the container and the food stuff received at the container to be evenly distributed at the weight sensing unit. In these embodiments, at least one of a first end and a second end of the bellows member may comprise a reflective coating layer, wherein the first end and the second end are opposite to each other. Moreover, in these embodiment the connection assembly may further comprise: a first fastening member at the base of the container and a second fastening member at the mounting member of the base unit. The first fastening member and the second fastening member may be configured to be movably engaged with each other.

In some embodiments, the container may comprise a concave-shaped inner bottom surface In some embodiments, the apparatus may further comprise: a heating unit configured to heat the food stuff received at the container, and a control unit configured to control the heating unit. In these embodiments, the control unit may be further configured to: determine a degree of doneness of the food stuff received at the container based on measurements from the weight sensing unit; and perform, based on the determined degree of doneness of the food stuff, at least one of: adjusting a setting of the apparatus, switching off the apparatus, and providing an audio and/or visual indication of the determined degree of doneness. Moreover, the control unit may be configured to determine the degree of doneness of the food stuff received at the container based on a measured change in weight of the food stuff.

According to the aspects and embodiments described above, the limitations of existing techniques are addressed. In particular, the above-described aspects and embodiments allows weight sensing functionalities to be incorporated into a cooking appliance while taking into account thermal interferences to the weight sensing measurements caused by the increased temperature at the cooking appliance. There is thus provided an apparatus comprising an arrangement that can help minimize weight measurement errors caused by a difference in temperature at the apparatus by providing low-cost insulation.

These and other aspects of the disclosure will be apparent from and elucidated with reference to the embodiment(s) described hereinafter.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF EMBODIMENTS

As noted above, there is provided an improved apparatus which addresses the existing problems.

Figure 1A:
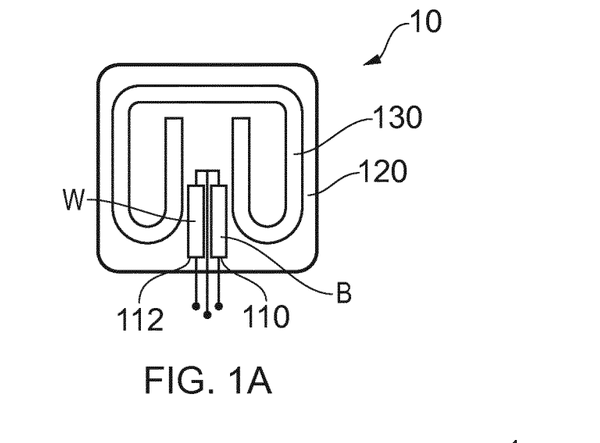
FIG. 1A shows a type of strain gauge load sensor used in currently known weighing apparatuses.
Figure 1B:
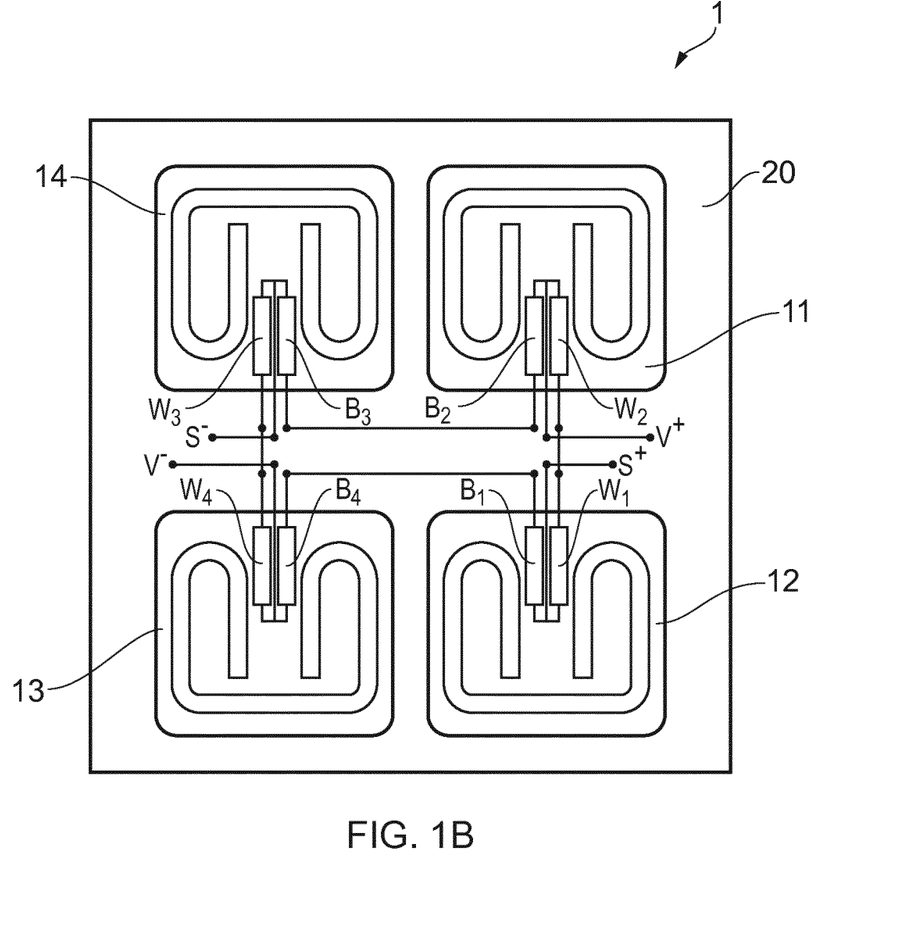
FIG. 1B shows four load sensors connected in a Wheatstone bridge circuit.

FIG. 1A shows a type of strain gauge load sensor 10 used in currently known weighing apparatuses. In more detail, FIG. 1 shows a first type of strain gauge load sensor which is widely employed in currently known weighing apparatuses due to its cost efficiency. The strain gauge load sensor 10 is provided in the form of a flat plate load cell comprising a pair of strain gauges 110, 112 with opposite resistive responses to the applied load/stress. The load sensor 10 further comprises a metal plate 120 having an outer frame for mounting and a suspended cantilever beam 130 in the center. The pair of resistive strain gauges 110, 112 are fixedly attached at the shoulder of the beam, and each of the pair of resistive strain gauges 110, 112 ($B_n$, $W_n$) exhibit opposite responses ($\pm a_n$) to the normal stress on the beam. The response at the pair of resistive strain gauges can be expressed as:

$$B_n = R_n(1+a_n L_n), W_n = R_n(1-a_n L_n) \quad [1]$$

where $L_n$ is the load (stress or force) to be measured, $\pm a_n$ is the response coefficients of resistors $B_n$ and $W_n$ respectively, $R_n$ is the resistance at zero load at each of the pair of resistive strain gauges, $a_n$ is far smaller than $1/L_n$ within the rated range of $L_n$, so $|\Delta B_n(L_n)|$ and $|\Delta W n(L_n)| \ll R_n$. In order to perform a weighing functionality, a plurality of strain gauge load sensors 10 may be used and the outer frame of the metal plate of each of the plurality of load sensors 10 may be fixedly attached to a horizontal mounting base, with the cantilever beam horizontally positioned at a foot. Typically, a set of four pre-matched (i.e. manufactured and provided as a set with identical thermal properties) load sensors 10 (i.e. $R_1=R_2=R_3=R_4=R$ and $a_1=a_2=a_3=a_4=a$, at least under the same thermal conditions) are used and the four load sensors 10 may be connected in a Wheatstone bridge circuit as illustrated in FIG. 1B. In FIG. 1B, each of the four load sensors 10 are labelled 11, 12, 13, 14 for ease of reference.

As shown in FIG. 1B, a weight sensing unit 1 comprises four load sensors 11, 12, 13, 14 and a mounting base 20. Each of the four load sensors 11, 12, 13, 14 is located at each of the four corners of the mounting base 20 underneath a load and symmetrically about the line of gravity of the load (not shown in the drawing). The voltage difference across the Wheatstone bridge circuit relative to excitation voltage ($V^+ - V^-$) as the sensing output can be expressed as:

$$S_o = \frac{S^+ - S^-}{V^+ - V^-} = \left[\frac{B_1 + B_4}{B_1 + B_4 +} - \frac{W_3 + W_4}{B_2 + B_3 +}\right] = \frac{(B_1 + B_4) \cdot (B_2 + B_3) - (W_1 + W_2) \cdot (W_3 + W_4)}{\left(\frac{B_1 + B_4 +}{W_1 + W_2}\right)\left(\frac{B_2 + B_3 +}{W_3 + W_4}\right)} \quad [2]$$

where $V^+$ and $V^-$ are the excitation voltage supplied to the Wheatstone bridge circuit.

Assuming that the four load sensors 11, 12, 13, 14 are pre-matched and that the thermal conditions in the environment is uniform for all of the four load sensors 11, 12, 13, 14, the output voltage difference may be expressed as:

$$S_o = \frac{4aR^2\left(\begin{array}{c} L_1 + L_2 + \\ L_3 + L_4 \end{array}\right) + a^2R^2(L_1-L_3)(L_2-L_4)}{16R^2 - a^2R^2(L_2-L_4)^2} = \frac{4aR^2 M + a^2R^2(L_1-L_3)(L_2-L_4)}{16R^2 - a^2R^2(L_2-L_4)^2} \quad [3]$$

where $M = L_1 + L_2 + L_3 + L_4$ is the sum of stress and would equal to the total weight borne by the four cells, if $L_n$ is measured only in a vertical direction and is caused by gravity. When $L_2 = L_4$, the output will be linearly proportional to M and far smaller than one, and the output voltage may then be expressed as:

$$S_o = \frac{4aR^2 M}{16R^2} = a\frac{M}{4} \quad [4]$$

When $L_2 \neq L_4$, equation [3] would be non-linear with respective to M and this may cause errors in measurement. Moreover, heat transferred to the mounting base 20 may induce thermal strain and deformation, which would disrupt the balance of the four load sensors 11, 12, 13, 14 or even induce an unwanted non-gravity component (e.g. friction). Therefore, in this case it is necessary to center the gravity line relative to the four load sensors 11, 12, 13, 14 in the design and loading stage of the weight sensing unit 1. It is also necessary to minimize thermal development at the mounting base 20 by providing thermal insulation and/or strain relaxation (e.g. counteraction of the strain using a flexible component).

One of the main concerns associated with performing weight sensing during a cooking operation is the thermal drifting and dispersion of the sensing characteristics (e.g. resistance R and response a) of a load sensor, since the temperature at the bottom of a cooking device can increase substantially during intense heating operations. There may be conductive heat transfer to the load sensors 11, 12, 13, 14 via fastening means located between the bottom of the cooking device and the load sensors 11, 12, 13, 14. The heat transfer rate to each of the plurality of load sensors in the case may not be the same. Dispersion of sensing characteristics due to non-uniform thermal environment means that the premise of pre-matching no longer applies. Based on the assumption that weight is equally distributed at the four load sensors 11, 12, 13, 14, i.e. L1=L2=L3=L4=M/4, and that dispersion only takes place in R while $a_1=a_2=a_3=a_4=a$ irrespective of the thermal non-uniformity, equation [2] can be expressed as equation [5] below:

$$S_o = \frac{(1 + a^2L^2)(R_1 - R_3)(R_2 - R_4) + 2aL\begin{bmatrix}(R_1 + R_4)(R_2 + R_3) + \\ (R_1 + R_2)(R_3 + R_4)\end{bmatrix}}{(R_1 + R_2 + R_3 + R_4)^2 - [aL(R_4 - R_2) + (R_1 - R_3)]^2} \quad [5]$$

Equation [5] can be expressed as a simple linear function of weight M, i.e. equation [6], when $(R_1-R_3)(R_2-R_4)=0$ AND $(aL\cdot(R_4-R_2)+(R_1-R_3))=0$ (i.e. $R_1=R_3$ AND $R_2=R_4$).

$$S_o = \frac{4aL(R_1 + R_2)^2}{4(R_1 + R_2)^2} = \frac{aM}{4} \quad [6]$$

Hence, it is more important to prevent dispersion thus imbalance of resistance R across the Wheatstone bridge arrangement which is caused by non-uniform temperature distribution than the drift of resistance R.

If dispersion only occurs in response a, while assuming $R_1=R_2=R_3=R_4=R$ irrespective of thermal non-uniformity, equation [2] can be expressed as equation [7]:

$$S_o = \frac{(a_1 + a_2 + a_3 + a_4)MR^2 + R^2L^2(a_1 - a_3)(a_2 - a_4)}{16R^2 - R^2L^2(a_4 - a_2)^2} \quad [7]$$

Equation [7] can be expressed as a simple linear function of M, i.e. equation [8], when $a_2=a_4$.

$$S_o = \frac{(a_1 + a_2 + a_3 + a_4)M}{16} = \frac{a'M}{4} \quad [8]$$

where a' is the mean response (i.e. $a'=(a_1+a_2+a_3+a_4)/4$)) of the four load sensors 11, 12, 13, 14. Otherwise, in case of a presence of mismatch between $a_2$ and $a_4$, the output will be a non-linear function of the total weight load. Since the slope a'/4 of the whole configuration is often factory-calibrated at a moderate temperature, it is important to minimize both the change and inhomogeneity of temperature at the four load sensors 11, 12, 13, 14 to retain a uniformity at the Wheatstone bridge and to prevent a drift of the slope.

Based on the mathematical explanation presented above, it can be recognized that the robust operation of a quad-cell (load sensor) Wheatstone configuration for the purpose of continuous weight sensing relies on a number of premises: (1) pre-matching resistance R and response a of the four load sensors 11, 12, 13, 14 before installation; (2) ensuring equal and vertical loading at the load sensors during both installation and operation; and (3) uniform thermal environment and minimizing thermal changes around the four load sensors 11, 12, 13, 14 during operation.

Figure 1C:
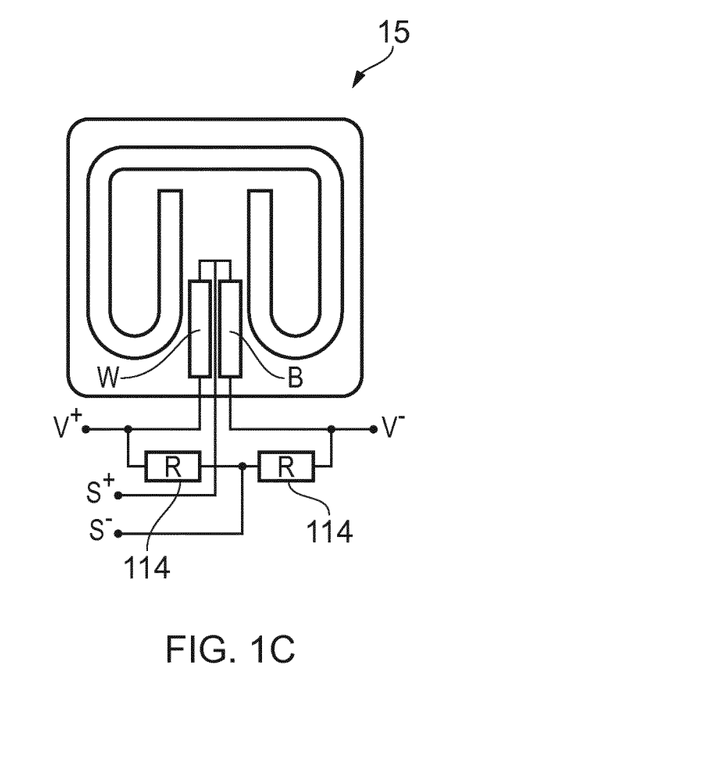
FIG. 1C shows yet another Wheatstone bridge circuit configuration comprising a single strain gauge load sensor, used in currently known weighing apparatuses.

FIG. 1C shows yet another Wheatstone bridge circuit configuration comprising a single strain gauge load sensor 15, used in currently known weighing apparatuses, which can be used as an alternative to a quad-cell (load sensor) Wheatstone configuration as shown in FIG. 1B. As shown in FIG. 1C, the load sensor 15 comprises a pair of strain gauges which are paired to two identical resistors 114 free of stress so as to form a Wheatstone bridge arrangement. The output of each bridge in this arrangement can be expressed by equation [9]:

$$S_{ok} = \left(\frac{B_k}{2R_k} - \frac{1}{2}\right) = \frac{a_k L_k}{2} \quad [9]$$

The summation of the output over all bridges gives the total weight $M=\Sigma L_k$ provided that $a_k$ are determined in factory calibration and remains unchanged during operation. An advantage provided by this configuration is that uniform temperature distribution is not required around the load sensors in order to achieve accurate measurements. However, the sensitivity of measurements is reduced by half. Also, in this configuration additional precisely paired resistors and multiple op-amplifiers are required for separate voltage reading.

Figure 2:
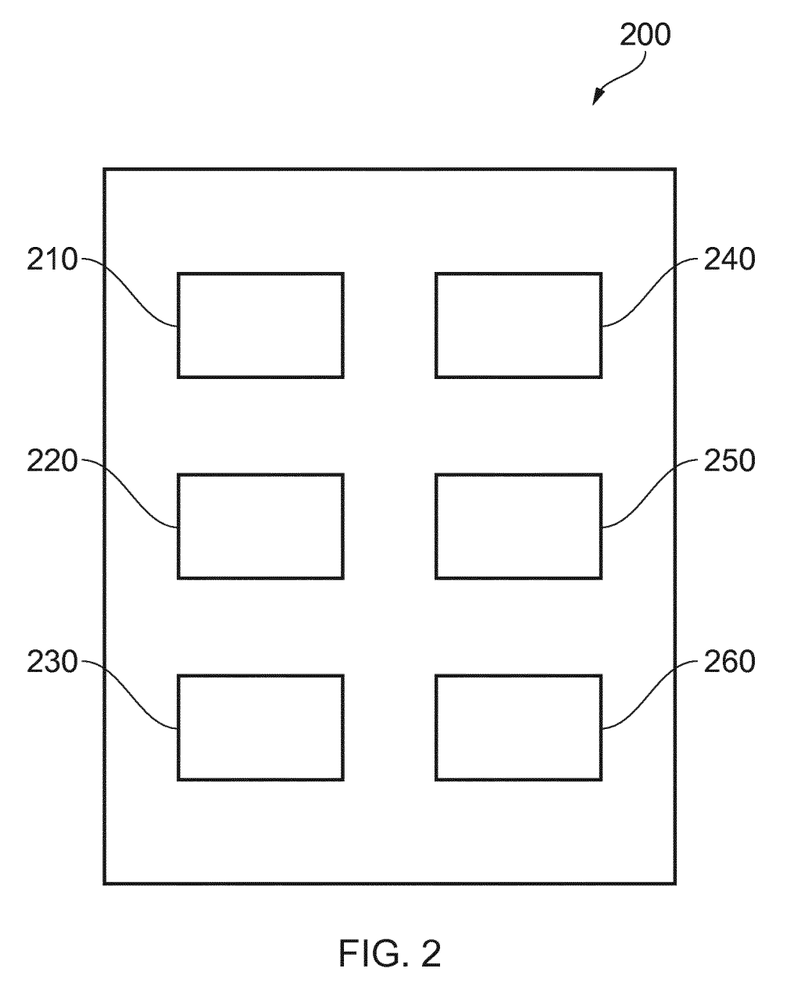
FIG. 2 shows a block diagram of an apparatus according to an embodiment.

FIG. 2 shows a block diagram of an apparatus 200 according to an embodiment. In some embodiments, the apparatus 200 may be a cooking device such as an air fryer, a hot plate, or a slow cooker. It will be appreciated that the apparatus 200 may be any apparatus that comprise cooking and/or food processing functionalities.

As illustrated in FIG. 2, the apparatus 200 comprises a container 210, a base unit 220, a weight sensing unit 230, a connection assembly 240, a heating unit 250, and a control unit 260. The container 210 is configured to receive a food stuff (e.g. a plurality of food ingredients). In some embodiments, the container 210 may be a flat-top surface onto which food stuff can be placed. In some other embodiments, the container 210 may comprise a concave-shaped inner bottom surface.

Although not illustrated in FIG. 2, in some embodiments the apparatus 200 may comprise a covering element for covering the container 210 to container the food stuff within. The covering element may be provided in the form of a lid that is removable from the container 210, or a hinged lid. In some embodiments, a lock mechanism may be provided so as to secure the covering element at the container 210 during use of the apparatus 200.

The base unit 220 comprises a mounting member and a plurality of outer supporting members. The mounting member may comprise metal (e.g. aluminium alloy or steel) and/or other types of heat conductive material. In some embodiments, the mounting member may be provided as a mounting plate and the plurality of outer supporting members may be provided as a number of supporting feet. For example, in some embodiments the base unit 220 may comprise a rectangular-shaped mounting plate with a foot provided adjacent to each corner of the mounting plate for support.

The weight sensing unit 230 is configured to measure a weight of the food stuff contained in the container 210. The weight sensing unit 230 comprises a plurality of strain gauge load sensors arranged at the mounting member of the base unit 220. In some embodiments, each of the plurality of strain gauge load sensors may be arranged horizontally between a respective outer supporting member of the base unit 220 and the mounting member of the base unit 220. This will be described in more detail with reference to FIG. 3 to FIG. 5.

In some embodiments, the plurality of strain gauge load sensors may be arranged in a Wheatstone bridge circuit. In such arrangement, four flat-plate strain gauge load sensors are connected in the Wheatstone bridge circuit so as to reject non-load force effects (i.e. virtual forces due to uniform temperature changes). The voltage differences across the Wheatstone bridge circuit is amplified and digitalized relative to excitation. The output of the Wheatstone bridge circuit is directly related to the total load at all of the location of the plurality of strain gauge load sensors.

In some other embodiments, the plurality of strain gauge load sensors may be provided in the arrangement of at least three Wheatstone bridge circuits. In these embodiments, each of the circuits may comprise a flat-plate load sensor and a pair of pre-matched resistors. The voltage difference across each bridge is amplified, summed up either analogously or digitally and normalized relative to the excitation.

Figure 3:
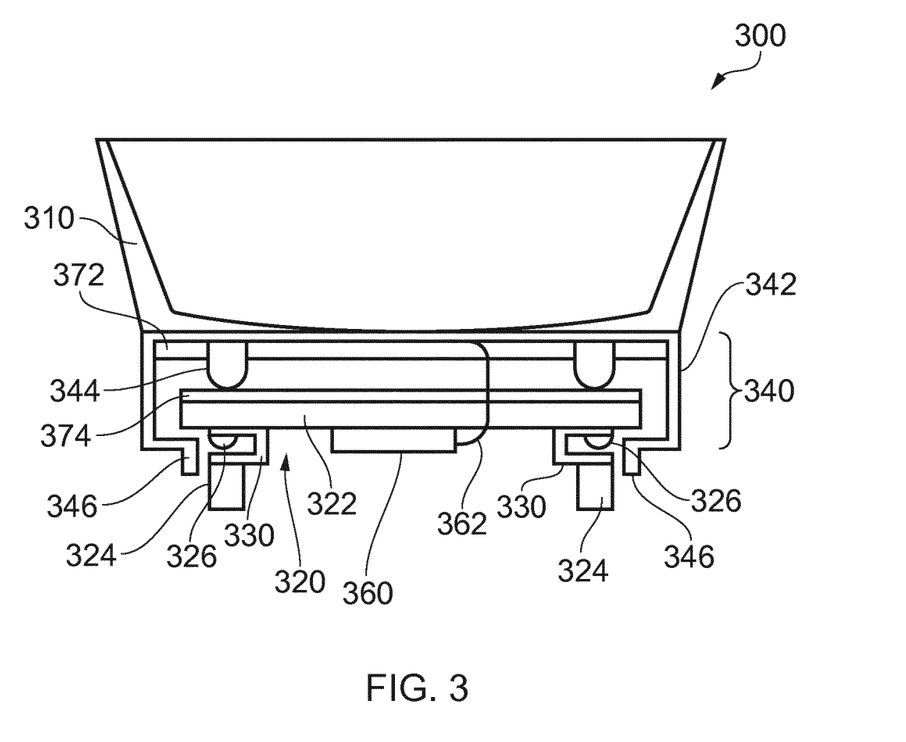
FIG. 3 is cross-sectional view of an implementation of an apparatus according to an embodiment.
Figure 4:
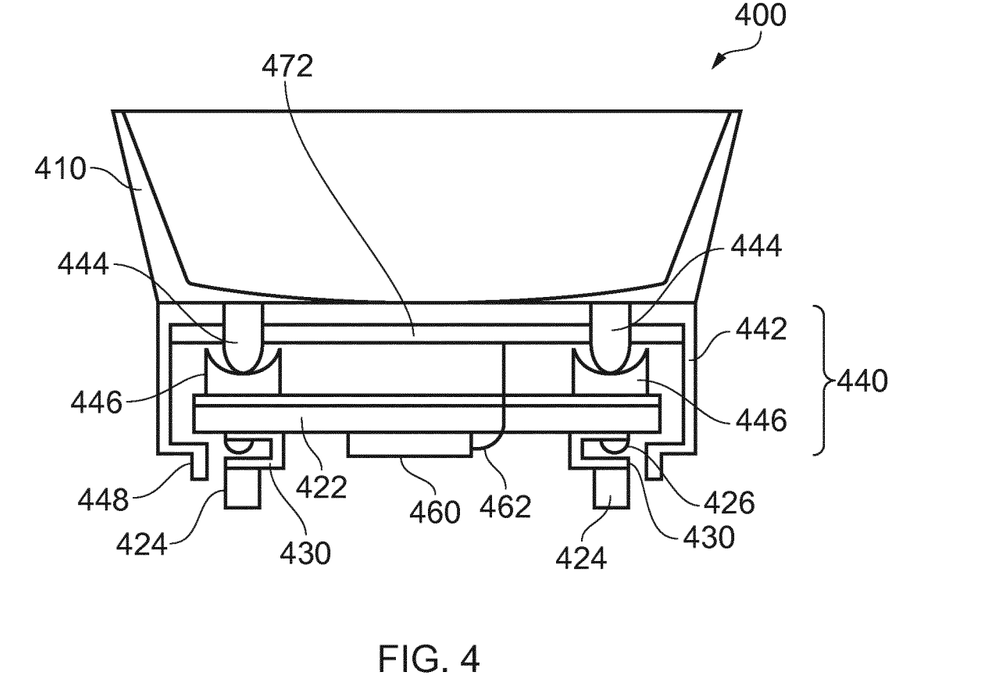
FIG. 4 is cross-sectional view of an implementation of an apparatus according to another embodiment.
Figure 5:
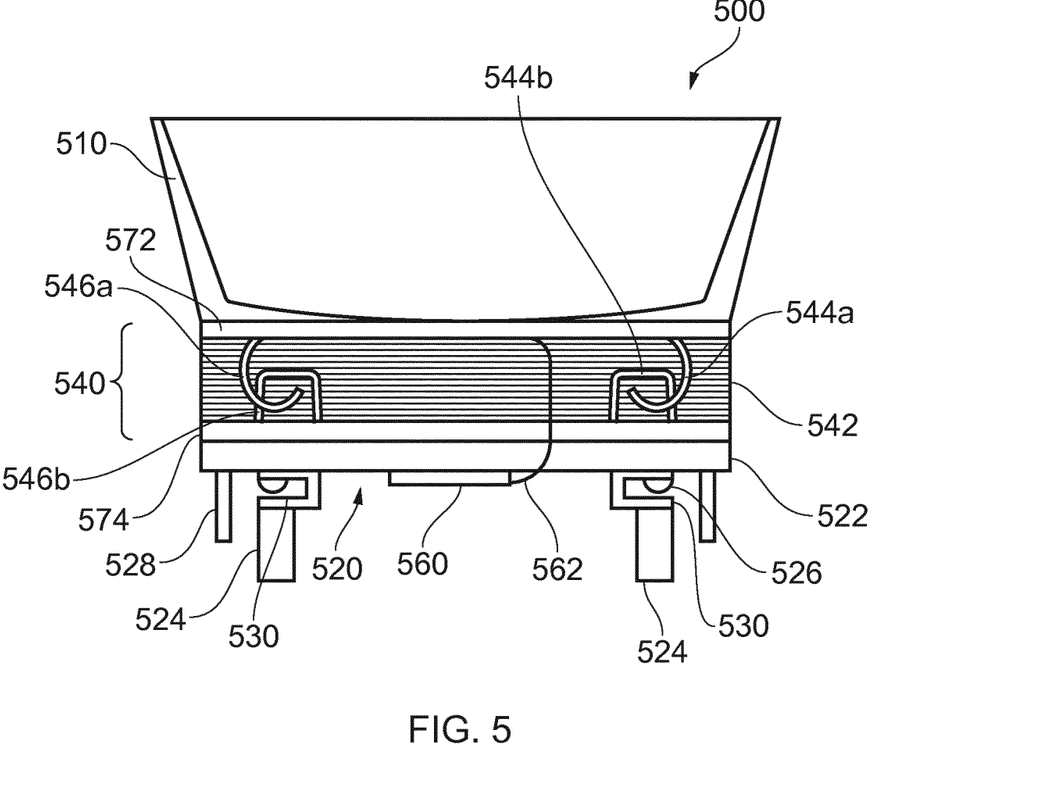
FIG. 5 is cross-sectional view of an implementation of an apparatus according to another embodiment.

The connection assembly 240 is arranged between the container 210 and the base unit 220. Examples of this arrangement are shown in FIG. 3 to FIG. 5. The connection assembly 240 is configured to provide a flexible and insulating connection between the container 210 and the base unit 220 so as to counteract thermal strain interference at the weight sensing unit and to reduce heat transfer between the container 210 and the base unit 220.

In some embodiments, the connection assembly 240 may be configured to flexibly connect the container 210 and the base unit 220 such that a line of gravity of a combined weight of the container 210 and the food stuff received at the container 210 aligns with the center point of a shape formed by the plurality of strain gauge load sensors of the weight sensing unit 230. For example, in some embodiments the weight sensing unit 230 may comprise four strain gauge load sensors each positioned adjacent to a respective corner of a rectangular-shaped mounting member of the base unit 220. In these embodiments, the connection assembly 240 may be configured such that the flexible connection between the container 210 and the base unit 220 provides a bias to guide the line of gravity of a combined weight of the container 210 and the food stuff towards a default position such that it aligns with the center point of a rectangular shape formed by the plurality of strain gauge load sensors of the weight sensing unit 230.

In some embodiments, the connection assembly 240 may comprise a housing unit and a plurality of inner supporting members. In these embodiments, the housing unit of the connection assembly 240 may be fixedly attached to a base of the container 210, and the housing unit may be configured to accommodate the mounting member of the base unit 220. Also, in these embodiments the plurality of inner supporting member may be fixedly attached to an inner top surface of the housing unit, and the plurality of inner supporting members may be in in movable contact with the base unit 220 such that the container 210 and the housing unit may be movable as a single part with respect to the base unit 220. Furthermore, in these embodiments, the connection assembly may further comprise a plurality of pivoting units. The plurality of pivoting units may be fixedly attached to the mounting member of the base unit 220. Each of the plurality of pivoting units may comprise a concave surface so as to allow movable coupling with a respective inner supporting member such that the combined weight of the container 210 and the food stuff received at the container 210 is evenly distributed at the weight sensing unit 230. In these embodiments, the housing unit may comprise a shoulder portion configured to be releasably engage with at least two opposite sides of the mounting member of the base unit 220 such that the base unit 220 is movably integrated with the housing unit and the container 210. The shoulder portion may comprise a shielding member configured to shield the weight sensing unit 230 from convective heat transfer from external surroundings. The shielding member may be a vertical neck portion extending downwards at the shoulder portion. In some embodiments, at least one of an inner surface of the housing unit and a top surface of the mounting member may comprise a reflective coating layer, which may comprise a polished coating of metal material. Examples of these embodiments are shown in FIG. 3 and FIG. 4 and will be described in more detail below.

In some other embodiments, the connection assembly 240 may comprise a bellows member enclosing a space between the container 210 and the base unit 220. The bellows member may comprise concertinaed sides so as to allow a combined weight of the container 210 and the food stuff received at the container 210 to be evenly distributed at the weight sensing unit 230. Also, the bellows member may comprise thermally non-conductive material (e.g. rubber). In these embodiments, at least one of a first end and a second end of the bellows member may comprise a reflective coating layer, the first end and the second end being opposite to each other. Also, in these embodiments, the connection assembly 240 may further comprise a first fastening member and a second fastening member. The first fastening member may be provided at the base of the container 210 and the second fastening member may be provided at the mounting member of the base unit 220, and the first fastening member and the second fastening member may be configured to be movably engaged with each other. One of the first fastening member and the second fastening member may be provided as a hook member while the other may be provided as an eyelet member. An example of these embodiments is shown in FIG. 5 and will be described in more detail below.

The heating unit 250 is configured to heat the food stuff received at the container 210. In some embodiments, the heating unit 250 may comprise a heating element such as a gas burner, an electric heating coil, a microwave generator, and a halogen lamp.

The control unit 260 is configured to control the heating unit 250. For example, in some embodiments the control unit 260 may be configured to control a gas valve of a gas burner, control the current in an electric heating coil, control the power and on/off cycle times of a microwave generator, and/or controlling the on/off cycle times of a halogen lamp.

In some embodiments, the control unit 260 may be configured to determine a degree of doneness of the food stuff received at the container 210 based on measurements from the weight sensing unit 230, and to perform, based on the determined degree of doneness of the food stuff, at least one of: adjusting a setting of the apparatus 200, switching off the apparatus 200, and providing an audio and/or visual indication of the determined degree of doneness. In these embodiments, the control unit 260 may be configured to determine the degree of doneness of the food stuff received at the container 210 based on a measured change in weight of the food stuff received in the container 210. In this case, the control unit 260 may be configured to continuously monitor a measure change in weight of the food stuff compared with respect to a measured initial weight. In some embodiments, the control unit 260 may be configured to determine the degree of doneness further based on factors such as a temperature setting of the heating unit 250, a type of the food stuff (e.g. meat or vegetables), a quantity of the food stuff, etc.

In some embodiments, the control unit 260 may be further configured to determine a status of the apparatus 200, for example a temperature setting of the heating unit 250, a temperature of the food stuff received at the container 210, a time duration of the on/off cycle of a heating element of the heating unit 250, etc. and to perform an operation based on the determined status. As an example, the control unit 260 may determine that a temperature of the food stuff received at the container 210 has reached a predetermined temperature threshold, and to control the power of the heating unit 250 on this basis.

In some embodiments, the control unit 260 or part of the control unit 260 (e.g. a printed circuit board) may be located at the base unit 220. An example of this arrangement is demonstrated in FIG. 3 to FIG. 5, where a part of the control unit (a weighing printed circuit board) configured to determine a weight or a change of weight of the food stuff received at the container using measurements from the strain gauge load sensors of the weight sensing unit is located at the base unit.

The control unit 260 can comprise one or more processors, processing units, multi-core processor or modules that are configured or programmed to control the apparatus 200 in the manner described herein. In particular implementations, the control unit 260 can comprise a plurality of software and/or hardware modules that are each configured to perform, or are for performing, individual or multiple steps of the operations described herein.

The control unit 260 can be implemented in numerous ways, with software and/or hardware, to perform the various functions described herein. The control unit 260 may comprise one or more microprocessors or digital signal processor (DSPs) that may be programmed using software or computer program code to perform the required functions and/or to control components of the control unit 260 to effect the required functions. The control unit 260 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

In some embodiments, the apparatus 200 may further comprise a user interface (not shown in the drawing). The user interface of the apparatus 200 may be for use in providing a user of the apparatus 200 with information resulting from the determination of a weight of the food stuff received at the container 210, and/or the determination of a change of weight of the food stuff received at the container 210, and/or the determination of a degree of doneness of the food stuff received at the container 210 at the control unit 260. The control unit 260 of the apparatus 200 may be configured to control the user interface to provide the information relating to a weight of the food stuff received at the container 210. The user interface as referred to herein may be any user interface that enables the rendering (or output or display) of data (or information) to a user of the apparatus 200. The user interface may comprise a display unit in some embodiments.

Alternatively or in addition, a user interface as referred to herein may be any user interface that enables a user of the apparatus 200 to provide additional user input, interact with and/or control the apparatus 200. For example, a user interface as referred to herein can comprise one or more switches, one or more buttons, a keypad, a keyboard, a gesture recognition sensor, a touch screen or an application (for example, on a tablet or smartphone), one or more microphones or any other audio component, or any other user interface component, or combination of user interface components.

It will be appreciated that FIG. 2 only shows the components required to illustrate an aspect of the apparatus 200, and in a practical implementation, the apparatus 200 may comprise alternative or additional components to those shown. For example, the apparatus 200 may comprise a battery or other power supply for powering the apparatus 200 or means for connecting the apparatus 200 to a mains power supply. It will also be appreciated that in some embodiments, the apparatus 200 may not comprise a heating unit 250 or a control unit 260. In these embodiments, a control unit may be provided externally and the control unit may be connected to the components of the apparatus 200 (e.g. the weight sensing unit) wirelessly or via a wired connection.

FIG. 3 is cross-sectional view of an implementation of an apparatus 300 according to an embodiment. With reference to FIG. 3, the apparatus 300 comprises a container 310, a base unit 320, a weight sensing unit 330, a connection assembly 340, and a weighing printed circuit board 360. Although not shown in FIG. 3, the apparatus 300 further comprises a heating unit.

The container 310 is configured to receive a food stuff. In this embodiment, the container 310 comprises a concave-shaped inner bottom surface so as to guide the food stuff received at the container 310 towards a center of the bottom surface. This reduces the likelihood of an uneven distribution of weight of the food stuff at the bottom surface of the container 310 which may in turn cause erroneous measurements at the weight sensing unit 330 of the apparatus 300.

The base unit 320 in the present embodiment comprises a mounting member 322 in the form of a rectangular metal mounting plate, and a plurality of outer supporting members 324 in the form of outer supporting feet. Specifically, in this embodiment the base unit 320 in this embodiment comprises four outer supporting members 324, although because FIG. 3 is a cross-sectional view of the apparatus 300 only two of the four outer supporting members 324 are shown in the drawing. It will be understood that the four supporting members 324 are arranged such that each of the four supporting members 324 is positioned adjacent to a respective one of the four corners of the rectangular mounting plate 322.

The weight sensing unit 330 is configured to measure a weight of the food stuff contained in the container 310, and in the present embodiment the weight sensing unit 330 comprises a plurality of strain gauge load sensors arranged at the mounting member 322, each being arranged horizontally between a respective outer supporting member 324 and the mounting member 322 and fastened to the mounting member 322 via thermos-conductive connecting members made of material with a sufficiently high stiffness and a low thermal expansion coefficient. Although not explicitly illustrated in FIG. 3, the plurality of strain gauge load sensors of the weight sensing unit 330 in this embodiment are arranged in a Wheatstone bridge circuit.

As shown in FIG. 3, in the present embodiment the base unit 320 further comprises a plurality of overload stopping members 326. Each of the overload stopping members 326 is provided at a respective strain gauge load sensor of the weight sensing unit 330 so as to mechanically limit the deflection and/or travel of the strain gauge load sensor and thereby protect the strain gauge load sensors of the weight sensing unit 330 from being damaged due to overloading.

The connection assembly 340 in this embodiment comprises a housing unit 342 and a plurality of inner supporting members 344 in the form of inner supporting feet. As shown in FIG. 3, the housing unit 342 of the connection assembly 340 is fixedly attached to a base of the container 310. Also, the housing unit 342 is configured to accommodate the mounting member 322 of the base unit 320. The plurality of inner supporting members 344 are fixedly attached to an inner top surface of the housing unit 342 and are in movable contact with the base unit 320. Specifically, in this embodiment the plurality of inner supporting members 344 are in movable contact with the mounting member 322. Since the housing unit 342 is fixedly attached to the base of the container 310, and the plurality of inner supporting members 344 are fixedly attached to the inner top surface of the housing unit 342 and in movable contact with the mounting member 322 of the base unit 320, the container 310 and the housing unit 342 are movable as a single part with respect to the base unit 320. For example, the container 310 and the housing 342 may be shifted towards a certain direction as a single part from its default position (i.e. centered).

The housing unit 342 comprises a shoulder portion configured to be releasably engage with at least two opposite sides of the mounting member 322 of the base unit 320 such that the base unit 320 is movably integrated with the housing unit 342 and the container 310. Hence, although in this embodiment the container 310 and the connection assembly 340 are not directly attached to the base unit 320, all of the components can be moved together in an integrated manner without shifting the line of gravity of the container 310 and the housing unit 342. In this embodiment, the shoulder portion comprises a shielding member 346 (i.e. a vertical neck portion extending downwards) configured to shield the weight sensing unit 330 from convective heat transfer from external surroundings.

There is further provided a first reflective coating layer 372 and a second reflective coating layer 374 at the connection assembly 340. The first and second reflective coating layers 372, 374 comprise high reflectivity (and thus low emissivity and low absorbance) material. In the preset embodiment, the first reflective coating layer 372 is provided at an inner top surface of the housing unit 342 and the second reflective coating layer 374 is provided at a top surface of the mounting member 322. The reflective coating layers 372, 374 help reduce an amount of radiative heat transfer from the container 310 (e.g. heated food stuff) to the weight sensing unit 330 and thus reduce the likelihood of erroneous measurements at the strain gauge load sensors of the weight sensing unit 330.

The weighing printed circuit board (PCB) 360 is provided at an underside of the mounting member 322. The weighing PCB 360 serves as part of a control unit which is configured to control the heating unit (not shown in the drawing) and to determine a degree of doneness of the food stuff received at the container 310 based on measurements from the weight sensing unit 330. As shown in FIG. 3, the weighing PCB 360 is connected to a main printed circuit board (not shown in the drawing) via a wiring 362 such that measurements at the strain gauge load sensors of the weight sensing unit 330 can be communicated to the main circuit board for the purpose of determining the degree of doneness of the food stuff received at the container 310.

In the present embodiment, undesired interference at weight sensing unit 330 is reduced in a number of ways. Firstly, conductive heat transfer to the weight sensing unit 330 is reduced by minimizing contact between the container 310 and the base unit 320 through providing an air gap between the container 310 and the base unit 320. This air gap is maintained by way of providing the housing unit 342 which also at least partially encloses the air gap to minimize heat transfer from external surroundings. The plurality of inner supporting members 344 also help minimize a physical contact (and therefore conductive heat transfer) between the container 310 and the base unit 320. Secondly, radiative heat transfer is reduced by providing the first and second reflective coating layers 372, 374 on an inner surface of the housing unit 342 as well as the top surface of the mounting member 322. Thirdly, convective heat transfer is reduced by providing a shield member 346 at the housing unit 342 as explained above. Fourthly, the strain gauge load sensors of the weight sensing unit 330 are fastened to the mounting member 322 via connecting members that are made of material with a sufficiently high stiffness and a low thermal expansion coefficient. Due to the high stiffness and low thermal expansion coefficient, the connecting members have a high resilience against deformation, which in turn also reduces the likelihood of subjecting the respective strain gauge load sensors to deformation over their life cycles.

Accordingly, when heated food stuff is received at the container 310 or when the container 310 is heated by the heating unit, the effects caused by the increase of temperature at the container 310 can be minimized at the weight sensing unit 330. Moreover, the flexible and insulating connection provided by the connection assembly 340 between the container 310 and the base unit 320 serves to counteract any thermal strain before the interference of the thermal strain transfers to the weight sensing unit 330, which in turn reduces unwanted loading at the strain gauge load sensors of the weight sensing unit 330.

Although it is illustrated in FIG. 3 that a reflective coating layers are provided at the inner top surface of the housing unit 342 and the top surface of the mounting member 322, in alternative embodiments one or more additional reflective coating layers may be provided at other inner surfaces of the housing unit (e.g. inner side surfaces).

FIG. 4 is cross-sectional view of an implementation of an apparatus 400 according to another embodiment. With reference to FIG. 4, the apparatus 400 comprises a container 410, a base unit 420, a weight sensing unit 430, a connection assembly 440, and a weighing printed circuit board 460. Although not shown in FIG. 4, the apparatus 400 further comprises a heating unit.

The container 410 is configured to receive a food stuff. In this embodiment, the container 410 comprises a concave-shaped inner bottom surface so as to guide the food stuff received at the container 410 towards a center of the bottom surface. This reduces the likelihood of an uneven distribution of weight of the food stuff at the bottom surface of the container 410 which may in turn cause erroneous measurements at the weight sensing unit 430 of the apparatus 400.

The base unit 420 in the present embodiment comprises a mounting member 422 in the form of a rectangular metal mounting plate, and a plurality of outer supporting members 424 in the form of outer supporting feet. Specifically, in this embodiment the base unit 420 in this embodiment comprises four outer supporting members 424, although because FIG. 4 is a cross-sectional view of the apparatus 400 only two of the four outer supporting members 424 are shown in the drawing. It will be understood that the four supporting members 424 are arranged such that each of the four supporting members 424 are is adjacent to a respective one of the four corners of the rectangular mounting plate 422.

The weight sensing unit 430 is configured to measure a weight of the food stuff contained in the container 410, an in the present embodiment the weight sensing unit 430 comprises a plurality of strain gauge load sensors arranged at the mounting member 422, each being arranged horizontally between a respective outer supporting member 424 and the mounting member 422 and fastened to the mounting member 422 via thermos-conductive connecting members made of material with a sufficiently high stiffness and a low thermal expansion coefficient. Although not explicitly illustrated in FIG. 4, the plurality of strain gauge load sensors of the weight sensing unit 430 in this embodiment are arranged in a Wheatstone bridge circuit.

As shown in FIG. 4, in the present embodiment the base unit 420 further comprises a plurality of overload stopping members 426. Each of the overload stopping members 426 is provided at a respective strain gauge load sensor of the weight sensing unit 430 so as to mechanically limit the deflection and/or travel of the strain gauge load sensor and thereby protect the strain gauge load sensors of the weight sensing unit 430 from being damaged due to overloading.

The connection assembly 440 in this embodiment comprises a housing unit 442 and a plurality of inner supporting members 444 in the form of inner supporting feet. As shown in FIG. 4, the housing unit 342 of the connection assembly 340 is fixedly attached to a base of the container 410. Also, the housing unit 442 is configured to accommodate the mounting member 422 of the base unit 420. The plurality of inner supporting members 444 are fixedly attached to an inner top surface of the housing unit 442 and are in movable contact with the base unit 420. Specifically, in this embodiment a plurality of pivoting units 446 are provided at the connection assembly 440, each of the plurality of pivoting units 446 corresponding to a respective one of the plurality of inner supporting members 444. Also, each of the plurality of pivoting units 446 is fixedly attached to the mounting member 422 and comprises a concave surface. The concave surface of each of the pivoting units 446 allows movable coupling with a respective inner supporting member 444. Therefore, even when any one of the plurality of inner supporting members 444 shifts position due to deformation caused by a change in temperature, the combined weight of the container 410 and the food stuff received at the container 410 can still be evenly distributed at the weight sensing unit 430 by means of maintaining contact between the shifted inner supporting member 444 and its corresponding pivoting unit 446 via the concave surface.

Moreover, in this embodiment, since the housing unit 442 is fixedly attached to the base of the container 410, and the plurality of inner supporting members 444 are fixedly attached to the inner top surface of the housing unit 442 and in movable contact with the pivoting units 446 (which are in turn fixedly attached to the mounting member 422), the container 410 and the housing unit 442 are movable as a single part with respect to the base unit 420. For example, the container 410 and the housing 442 may be shifted towards a certain direction as a single part from its default position (i.e. centered).

The housing unit 442 comprises a shoulder portion configured to be releasably engage with at least two opposite sides of the mounting member 422 of the base unit 420 such that the base unit 420 is movably integrated with the housing unit 442 and the container 410. Hence, although in this embodiment the container 410 and the connection assembly 440 are not directly attached to the base unit 420, all of the components can still be moved together in an integrated manner without shifting the line of gravity of the container 410 and the housing unit 442. In this embodiment, the shoulder portion comprises a shielding member 448 configured to shield the weight sensing unit 430 from convective heat transfer from external surroundings.

There is further provided a first reflective coating layer 472 and a second reflective coating layer 474 at the connection assembly 440. The first and second reflective coating layers 472, 474 comprise high reflectivity (and thus low emissivity and low absorbance) material. In the present embodiment, the first reflective coating layer 472 is provided at an inner top surface of the housing unit 442 and the second reflective coating layer 474 is provided at a top surface of the mounting member 422. The reflective coating layers 472, 474 help reduce an amount of radiative heat transfer from the container 410 (e.g. heated food stuff) to the weight sensing unit 430 and thus reduce the likelihood of erroneous measurements at the strain gauge load sensors of the weight sensing unit 430.

The weighing printed circuit board (PCB) 460 is provided at an underside of the mounting member 422. The weighting PCB 460 serves as part of a control unit which is configured to control the heating unit (not shown in the drawing) and to determine a degree of doneness of the food stuff received at the container 410 based on measurements from the weight sensing unit 430. As shown in FIG. 4, the weighing PCB 460 is connected to a main printed circuit board (not shown in the drawing) via a wiring 462 such that measurements at the strain gauge load sensors of the weight sensing unit 430 can be communicated to the main circuit board for the purpose of determining the degree of doneness of the food stuff received at the container 410.

In the present embodiment, undesired interference at the weight sensing unit 430 is reduced in a number of ways. Firstly, conductive heat transfer to the weight sensing unit 430 is reduced by minimizing contact between the container 410 and the base unit 430 through providing an air gap between the container 410 and the base unit 430. This air gap is maintained by way of providing the housing unit 442 which also at least partially encloses the air gap to minimize heat transfer from external surroundings. The plurality of inner supporting members 444 also help minimize a physical contact (and therefore conductive heat transfer) between the container 410 and the base unit 420. Secondly, radiative heat transfer is reduced by providing the first and second reflective coating layers 472, 474 on an inner surface of the housing unit 442 as well as the top surface of the mounting member 422. Thirdly, convective heat transfer is reduced by providing a shield member 448 at the housing unit 442 as explained above. Fourthly, the strain gauge load sensors of the weight sensing unit 430 are fastened to the mounting member 422 via connecting members that are made of material with a sufficiently high stiffness and a low thermal expansion coefficient. Due to the high stiffness and low thermal expansion coefficient, the connecting members have a high resilience against deformation, which in turn also reduces the likelihood of subjecting the respective strain gauge load sensors to deformation over their life cycles.

Accordingly, when heated food stuff is received at the container 410 or when the container 410 is heated by the heating unit, the effects caused by the increase of temperature at the container 410 can be minimized at the weight sensing unit 430. Moreover, the flexible and insulating connection provided by the connection assembly 440 between the container 410 and the base unit 420 serves to counteract any thermal strain before the interference of the thermal strain transfers to the weight sensing unit 430, which in turn reduces unwanted loading at the strain gauge load sensors of the weight sensing unit 430.

Although it is illustrated in FIG. 4 that reflective coating layers are provided at the inner top surface of the housing unit 442 and the top surface of the mounting member 422, in alternative embodiments one or more additional reflective coating layers may be provided at other inner surfaces of the housing unit (e.g. inner side surfaces).

FIG. 5 is cross-sectional view of an implementation of an apparatus 500 according to another embodiment. With reference to FIG. 5, the apparatus 500 comprises a container 510, a base unit 520, a weight sensing unit 530, a connection assembly 540, and a weighing printed circuit board 560. Although not shown in FIG. 5, the apparatus 500 further comprises a heating unit.

The container 510 is configured to receive a food stuff. In this embodiment, the container 510 comprises a concave-shaped inner bottom surface so as to guide the food stuff received at the container 510 towards a center of the bottom surface. This reduces the likelihood of an uneven distribution of weight of the food stuff at the bottom surface of the container 510 which may in turn cause erroneous measurements at the weight sensing unit 530 of the apparatus 500.

The base unit 520 in the present embodiment comprises a mounting member 522 in the form of a rectangular metal mounting plate, a plurality of outer supporting members 524 in the form of outer supporting feet, and a shielding member 528. Specifically, in this embodiment the base unit 520 in this embodiment comprises four outer supporting members 524, although because FIG. 5 is a cross-sectional view of the apparatus 500 only two of the four outer supporting members 524 are shown in the drawing. It will be understood that the four supporting members 524 are arranged such that each of the four supporting members 524 are is adjacent to a respective one of the four corners of the rectangular mounting plate 522. The shielding member 528 in this embodiment is provided in the form of a vertical neck portion extending downwards from the mounting member 522, and is configured to shield the weight sensing unit 530 from convective heat transfer from external surroundings.

The weight sensing unit 530 is configured to measure a weight of the food stuff contained in the container 510, and in the present embodiment the weight sensing unit 530 comprises a plurality of strain gauge load sensors arranged at the mounting member 522, each being arranged horizontally between a respective outer supporting member 524 and the mounting member 522 and fastened to the mounting member 522 via thermos-conductive connecting members made of material with a sufficiently high stiffness and a low thermal expansion coefficient. Although not explicitly illustrated in FIG. 5, the plurality of strain gauge load sensors of the weight sensing unit 530 in this embodiment are arranged in a Wheatstone bridge circuit.

As shown in FIG. 5, in the present embodiment the base unit 520 further comprises a plurality of overload stopping members 526. Each of the overload stopping members 526 is provided at a respective strain gauge load sensor of the weight sensing unit 530 so as to mechanically limit the deflection and/or travel of the strain gauge load sensor and thereby protect the strain gauge load sensors of the weight sensing unit 530 from being damaged due to overloading.

The connection assembly 440 in this embodiment comprises a bellows member 542, a first fastening member 544a, a second fastening member 544b, a third fastening member 546a, and a fourth fastening member 526b.

The bellows member 542 encloses a space between the container 510 and the base unit 520, and the bellows member 542 comprises concertinaed sides so as to allow a combined weight of the container 510 and the food stuff received at the container 510 to be evenly distributed at the weight sensing unit 530. In this embodiment, the bellows member 542 comprises thermally non-conductive material (e.g. rubber). Furthermore, the bellows member 542 comprises a first end and a second end, the first end and the second end being opposite to each other. A first reflective coating layer 572 is provided at the first end of the bellows member 542 and a second reflective coating layer 574 is provided at the second end of the bellows member 542. The first and second reflective coating layers 572, 574 comprise high reflectivity (and thus low emissivity and low absorbance) material. The reflective coating layers help reduce an amount of radiative heat transfer from the container 510 (e.g. heated food stuff) to the weight sensing unit 530 and thus reduce the likelihood of erroneous measurements at the strain gauge load sensors of the weight sensing unit 530.

In this embodiment, the first fastening member 544a is provided as a hook member while the second fastening member 544b is provided as an eyelet member such that the first fastening member 544a and the second fastening member 544b are movably engaged with each other. Similarly, the third fastening member 546a is provided as a hook member while the fourth fastening member 546b is provided as an eyelet member such that the third fastening member 546a and the fourth fastening member 546b are movably engaged with each other. The first fastening member 544a and the third fastening member 546a are both fixedly attached to a base of the container 510 and the second fastening member 544b and the fourth fastening member 546b are both fixedly attached to a top surface of the mounting member 522. When the bellows member 542 is compressed, the engagement between the first fastening member 544a and the second fastening member 544b and the engagement between the third fastening member 546a and the fourth fastening member 546b are slack, and when the bellows member 542 is stretched, the engagement between the first fastening member 544a and the second fastening member 544b and the engagement between the third fastening member 546a and the fourth fastening member 546b are taut.

Therefore, when the container 510 is lifted up by a user, the base unit 520 (together with the weight sensing unit 530) can also be lifted at the same time by way of the engagement between the first fastening member 544a and the second fastening member 544b and the engagement between the third fastening member 546a and the fourth fastening member 546b. As a result, the container 510 can be lifted up along with the base unit 520 without inducing an unnecessary amount of strain at the bellows member 542.

The weighing printed circuit board (PCB) 560 is provided at an underside of the mounting member 522. The PCB 560 serves as part of a control unit which is configured to control the heating unit (not shown in the drawing) and to determine a degree of doneness of the food stuff received at the container 510 based on measurements from the weight sensing unit 530. As shown in FIG. 5, the weighing PCB 560 is connected to a main printed circuit board (not shown in the drawing) via a wiring 562 such that measurements at the strain gauge load sensors of the weight sensing unit 530 can be communicated to the main circuit board for the purpose of determining the degree of doneness of the food stuff received at the container 510.

In the present embodiment, unwanted interference at the weight sensing unit 530 is reduced in a number of ways. Firstly, conductive heat transfer to the weight sensing unit 530 is reduced by minimizing contact between the container 510 and the base unit 520 through providing an air gap between the container 510 and the base unit 520. This air gap is maintained by way of providing a bellows member 542 which encloses the air gap to minimize heat transfer from external surroundings. Secondly, radiative heat transfer is reduced by providing the first and second reflective coating layers 572, 574 at opposite ends of the bellows member 542. Thirdly, convective heat transfer is reduced by providing a shield member 528 at the base unit 520 as explained above. Fourthly, the strain gauge load sensors of the weight sensing unit 530 are fastened to the mounting member 522 via connecting members that are made of material with a sufficiently high stiffness and a low thermal expansion coefficient. Due to the high stiffness and low thermal expansion coefficient, the connecting members have a high resilience against deformation, which in turn also reduces the likelihood of subjecting the respective strain gauge load sensors to deformation over their life cycles.

Accordingly, when heated food stuff is received at the container 50 or when the container 510 is heated by the heating unit, the effects caused by the increase of temperature at the container 510 can be minimized at the weight sensing unit 330. Moreover, the flexible and insulating connection provided by the connection assembly 540 between the container 510 and the base unit 520 serves to counteract any thermal strain before the interference of the thermal strain transfers to the weight sensing unit 530, which in turn reduces unwanted loading at the strain gauge load sensors of the weight sensing unit 530.

There is thus provided an improved apparatus capable of performing continuous weight sensing accurately during heating/cooking, the apparatus comprising an arrangement that can help minimize weight measurement errors and interferences caused by a difference in temperature at the apparatus by providing low-cost insulation.

There is also provided a computer program product comprising a computer readable medium, the computer readable medium having computer readable code embodied therein, the computer readable code being configured such that, on execution by a suitable computer or processor, the computer or processor is caused to perform the operations described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the operations according to the embodiments described herein.

It will also be appreciated that such a program may have many different architectural designs. For example, a program code implementing the functionality of the operations or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the operations set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant operation.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus comprising:
a container configured to receive a food stuff;
a base unit comprising a mounting member and a plurality of outer supporting members;
a weight sensing unit configured to measure a weight of the food stuff contained in the container, the weight sensing unit comprising a plurality of strain gauge load sensors arranged at the mounting member of the base unit; and
a connection assembly comprising a connecting member arranged between the container and the base unit, wherein the connection assembly is configured to provide a flexible and insulating connection between the container and the weight sensing unit so as to counteract thermal strain interference at the weight sensing unit and to reduce heat transfer between the container and the weight sensing unit, the connecting member being configured to flexibly connect the container and the base unit such as to bring a line of gravity of a combined weight of the container and the food stuff received at the container into alignment with a center point of a shape formed by the plurality of strain gauge load sensors, the connection assembly being configured such that the flexible connection provides a bias to guide the line of gravity towards a default position that aligns the line of gravity with the center point.

2. The apparatus according to claim 1, wherein each of the plurality of strain gauge load sensors is arranged horizontally between a respective outer supporting member of the base unit and the mounting member of the base unit.

3. The apparatus according to claim 1, wherein the connection assembly is configured to flexibly connect the container and the base unit such that the line of gravity of the combined weight of the container and the food stuff received at the container aligns with the center point of the shape formed by the plurality of strain gauge load sensors.

4. The apparatus according to claim 1, wherein the connection assembly comprises:
a housing unit fixedly attached to a base of the container, wherein the housing unit is configured to accommodate the mounting member of the base unit; and
a plurality of inner supporting members fixedly attached to an inner top surface of the housing unit, wherein the plurality of inner supporting members is in movable contact with the base unit such that the container and the housing unit are movable as a single part with respect to the base unit.

5. The apparatus according to claim 4, wherein the connection assembly further comprises:
a plurality of pivoting units fixedly attached to the mounting member of the base unit, wherein each of the plurality of pivoting units comprises a concave surface so as to allow movable coupling with a respective inner supporting member such that the combined weight of the container and the food stuff received at the container is evenly distributed at the weight sensing unit.

6. The apparatus according to claim 4, wherein the housing unit comprises a shoulder portion configured to releasably engage with at least two opposite sides of the mounting member of the base unit such that the base unit is movably integrated with the housing unit and the container.

7. The apparatus according to claim 6, wherein the shoulder portion comprises a shielding member configured to shield the weight sensing unit from convective heat transfer from external surroundings.

8. The apparatus according to claim 4, wherein at least one of an inner surface of the housing unit and a top surface of the mounting member comprises a reflective coating layer.

9. The apparatus according to claim 1, wherein the connection assembly comprises a bellows member enclosing a space between the container and the base unit, wherein the bellows member comprises concertinaed sides so as to allow a combined weight of the container and the food stuff received at the container to be evenly distributed at the weight sensing unit.

10. The apparatus according to claim 9, wherein at least one of a first end and a second end of the bellows member comprises a reflective coating layer, wherein the first end and the second end are opposite to each other.

11. The apparatus according to claim 9, wherein the connection assembly further comprises:
a first fastening member at the base of the container; and
a second fastening member at the mounting member of the base unit, wherein the first fastening member and the second fastening member are configured to be movably engaged with each other.

12. The apparatus according to claim 1, wherein the container comprises a concave-shaped inner bottom surface.

13. The apparatus according to claim 1, further comprising:
a heating unit configured to heat the food stuff received at the container; and
a control unit configured to control the heating unit.

14. The apparatus according to claim 13, wherein the control unit is further configured to:
determine a degree of doneness of the food stuff received at the container based on measurements from the weight sensing unit; and
perform, based on the determined degree of doneness of the food stuff, at least one of: adjusting a setting of the apparatus, switching off the apparatus, and providing an audio and/or visual indication of the determined degree of doneness.

15. The apparatus according to claim 14, wherein the control unit is configured to determine the degree of doneness of the food stuff received at the container based on a measured change in weight of the food stuff.

16. The apparatus according to claim 1, wherein the connecting member corresponds to one of a housing with a plurality of inner supporting members and a bellows member.

* * * * *